Patented Mar. 14, 1950

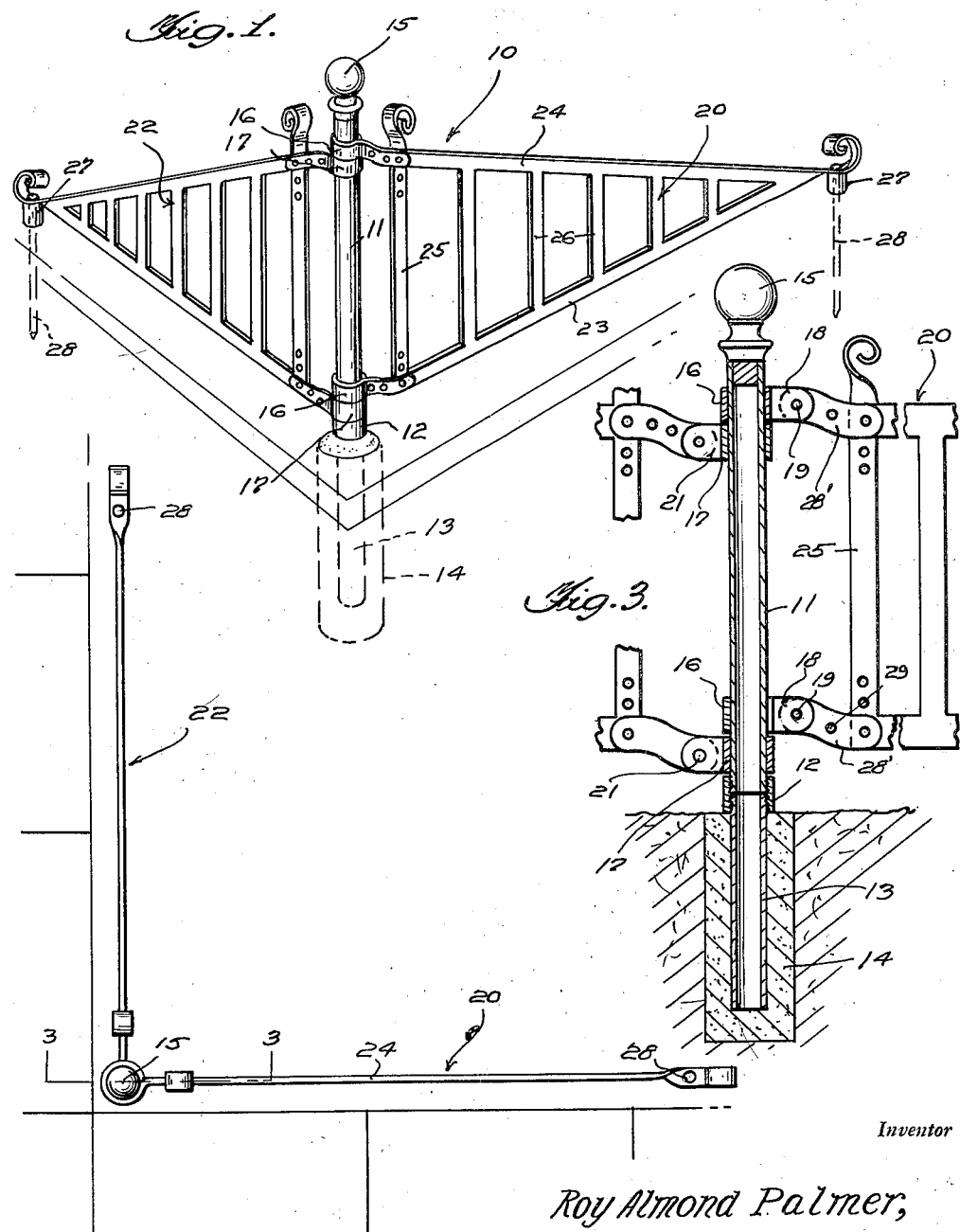

2,500,563

UNITED STATES PATENT OFFICE 2,500,563

CORNER PROTECTOR

Roy Almond Palmer, St. Paul, Minn.

Application August 31, 1946, Serial No. 694,364

1 Claim. (Cl. 256—27)

This invention relates to a corner protector and has for its primary object to discourage the crossing of corners of grass plots, lawns and the like.

Another object is to effectively barricade the corner of a grass plot or lawn and at the same time avoid interference with the mowing of the grass around the protector.

The above and other objects may be attained by employing this invention which embodies among its features a corner post adapted to be fixed in the earth adjacent the junction of two sides of a plot of ground, a pair of wings pivotally supported by the post and means to anchor the free ends of the wings to the earth adjacent adjoining edges of the property.

Other features include means to adjust the angular position of the wings in order to accommodate the slope of the lawn adjacent the corner which is to be protected and at the same time provide for the anchoring of the guard wings in proper position.

In the drawings:

Figure 1 is a perspective view of a lawn corner protector or guard illustrating its manner of use, Figure 2 is a top plan view of the guard illustrated in Figure 1, and Figure 3 is a vertical sectional view taken substantially along the line 3—3 of Figure 2.

Referring to the drawings in detail my improved lawn corner guard or protector designated generally 10 comprises a corner post 11 which is adapted to be coupled through the medium of a coupling 12 to a post section 13 which is preferably embedded in a concrete footing 14 in the ground. The upper end of the section 13 is externally screw threaded to receive a conventional pipe coupling into which the lower end of the post 11 is threaded as shown. The upper end of the post is preferably fitted with an ornament 15 such as a ball or the like.

Mounted for rotation on the post 11 adjacent opposite ends thereof are pairs of collars 16 and 17, and extending radially from the collars 16 are arms 18 which are provided with an opening 19 for the reception bolts by which a wing designated generally 20 is supported on the collars 16. Like the collars 16, each collar 17 is provided with a radial arm 21 forming a support for the wing designated generally 22, and these arms 21 are also pierced to receive bolts by which the wing 22 is detachably connected to the collar.

Each wing 20 and 22 comprises a generally triangular frame formed of a horizontal bar 23 from one end of which rises a divergent bar 24, and these bars are held in proper spaced relation by an end bar 25 and filler bars 26 which lie perpendicular to the bar 23. The wing 22 is the counterpart of the wing 20, and each wing is provided near its free end with a depending collar 27 which aligns axially with an opening formed in the bottom bar 23 for the reception of an anchoring pin 28 by which the wings may be held in proper position with one another.

Formed on the end of each horizontal bar 23 of each wing 20 and 22 at its junction with the perpendicular end bar 25 is a bracket 28 which is provided with spaced openings 29 through which the attaching bolt entering the opening 19 is adapted to be received. A similar bracket is attached to each wing 20 and 22 adjacent the junction of the inclined bar 24 with the end bar 25 thereof and like that previously described is provided with spaced openings for the reception of the attaching bolts at the upper end of its respective wing. It will thus be seen that by withdrawing the attaching bolts from the opening 19 and 29 and changing them to different positions, the tilt of the wing may be varied to agree with the slope of the lawn on which the device is used.

In use it will be understood that the post 11 having been properly positioned, the wings are placed thereon by slipping the collars 16 and 17 over the upper ends of the post after which the ornament 15 is placed in proper position on the post. The wings 20 and 22 may be swung about the vertical axis of the post to cause them to lie in planes parallel with adjoining edges of the plot to be protected, and the pins 28 are then introduced through the openings in the collars 27 into the ground, to anchor the wings in the desired position. Should the earth slope toward or away from the post along one of the angles at which a wing is positioned it will be obvious that by extracting the bolts fastening the wing to its respective arms 18 and replacing a bolt through a different opening 29, the angle or tilt of the wing may be varied to conform with the slope of the lawn to be guarded.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

A lawn protector comprising a post section adapted to be fixed in the ground near the area to be protected, the upper end of said post section projecting a short distance above the ground level and being screw threaded, a coupling threaded onto the extension on the post section, a post threadedly connected to the coupling, a pair of collars mounted on the post adjacent the coupling for rotation about the post, an arm extending radially from each collar, a second pair of collars mounted on the post for rotation near its upper end, an arm extending radially from each second-mentioned collar, wings detachably connected to the arms of each pair of collars and adapted to move through horizontal arcs about the post and anchoring pins extending through the wings adjacent the ends thereof remote from the post for entrance into the ground.

ROY ALMOND PALMER.

REFERENCES CITED

The following references are of record in the file of this patent:

UNITED STATES PATENTS

| Number | Name | Date |
| --- | --- | --- |
| 134,624 | Anderson | Jan. 7, 1873 |
| 741,650 | Frey | Oct. 20, 1903 |
| 932,355 | Thrasher et al. | Aug. 24, 1909 |
| 1,633,619 | Ward | June 28, 1927 |
| 2,074,688 | Friend | Mar. 23, 1937 |
| 2,318,205 | Drennan | May 4, 1943 |

FOREIGN PATENTS

| Number | Country | Date |
| --- | --- | --- |
| 562,565 | France | Sept. 8, 1923 |